United States Patent
Rauch et al.

(10) Patent No.: US 10,976,171 B2
(45) Date of Patent: Apr. 13, 2021

(54) NAVIGATION SYSTEM AND METHOD FOR OPERATING IT

(71) Applicant: Continental Automotive GmbH, Hannover (DE)

(72) Inventors: Manuel Rauch, Bodenmais (DE); Gebhard Oelmaier, Muehldof (DE); Urs Beck, Lappersdorf (DE); Kurt Stege, Thalmassing (DE)

(73) Assignee: Continental Automotive GmbH, Hannover (DE)

( * ) Notice: Subject to any disclaimer, the term of this patent is extended or adjusted under 35 U.S.C. 154(b) by 307 days.

(21) Appl. No.: 15/035,976

(22) PCT Filed: Nov. 10, 2014

(86) PCT No.: PCT/EP2014/074193
§ 371 (c)(1),
(2) Date: May 11, 2016

(87) PCT Pub. No.: WO2015/071224
PCT Pub. Date: May 21, 2015

(65) Prior Publication Data
US 2016/0273928 A1 Sep. 22, 2016

(30) Foreign Application Priority Data
Nov. 12, 2013 (DE) ................ DE10 2013 222 960.7

(51) Int. Cl.
*G01C 21/34* (2006.01)
*G01C 21/36* (2006.01)
*G08G 1/01* (2006.01)

(52) U.S. Cl.
CPC ...... *G01C 21/3492* (2013.01); *G01C 21/3461* (2013.01); *G01C 21/3679* (2013.01); *G08G 1/0116* (2013.01)

(58) Field of Classification Search
CPC .................................................. G01C 21/3476
See application file for complete search history.

(56) References Cited

U.S. PATENT DOCUMENTS

| 9,304,013 B2 | 4/2016 | Richter | |
|---|---|---|---|
| 2006/0015249 A1* | 1/2006 | Gieseke | G01C 21/3415 701/416 |

(Continued)

FOREIGN PATENT DOCUMENTS

| CN | 1598490 | 3/2005 |
|---|---|---|
| CN | 101881624 | 11/2010 |

(Continued)

*Primary Examiner* — Imran K Mustafa
(74) *Attorney, Agent, or Firm* — Cozen O'Connor

(57) ABSTRACT

A navigation system for ascertaining qualified special destinations includes: a database, which stores transport route nodes and route sections connecting the route sections and properties thereof; a route computation device; and a memory device. Special destinations stored in the database are each linked to one or more connecting nodes, for example motorway exits. Each special destination has, for each connecting node linked thereto, at least one associated first total route, connecting the special destination and the connecting node to one another, and an associated total route length. At least in the event of the first total route having a use restriction, the special destination and the connecting node also have at least one associated second total route that, at least for one restriction parameter, has lesser use restrictions.

15 Claims, 2 Drawing Sheets

(56) References Cited

U.S. PATENT DOCUMENTS

| | | | |
|---|---|---|---|
| 2006/0036363 A1* | 2/2006 | Crook | G01C 21/3461 701/533 |
| 2007/0225900 A1* | 9/2007 | Kropp | G01C 21/3461 701/418 |
| 2009/0005082 A1* | 1/2009 | Forstall | G01C 21/26 455/456.5 |
| 2011/0106429 A1* | 5/2011 | Poppen | G01C 21/3476 701/533 |

FOREIGN PATENT DOCUMENTS

| | | |
|---|---|---|
| CN | 102648396 | 8/2012 |
| DE | 10 2011 089 355 A1 | 6/2013 |
| JP | H 10 2749 A | 1/1998 |

* cited by examiner

NAVIGATION SYSTEM AND METHOD FOR OPERATING IT

CROSS-REFERENCE TO RELATED APPLICATIONS

This is a U.S. national stage of application No. PCT/EP2014/074193, filed on 11 Nov. 2014, which claims priority to the German Application No. 10 2013 222 960.7 filed 12 Nov. 2013, the content of both incorporated herein by reference.

BACKGROUND OF THE INVENTION

1. Field of the Invention

The invention relates to the field of electrical engineering and control engineering and specifically addresses the planning of routes in geographical systems of traffic node points that are represented in a database.

2. Related Art

Navigation systems for computing routes in geographical systems are not only known from automobile engineering, but generally also from logistics, and are nowadays offered for pedestrian navigation, for bicycle navigation and for the navigation of special vehicles.

In addition to the starting point and end point of the route and path sections located therebetween and traffic nodes, additionally accessible special destinations, such as for example gas stations, repair workshops, restaurants or other, possibly user-defined locations, which can be integrated into route planning, also play a particular role in route planning.

During route computation, specific connecting nodes, such as, for example, highway exits, are typically checked to see if specific special destinations are available in their geographical environment, typically defined by a geometric (linear) distance. When selected, the matter of whether the corresponding special destinations can also be reached from the respective connecting node by way of available path sections is not initially taken into consideration.

In addition, it is important in particular for vehicles with special use limitations to know whether corresponding paths between connecting nodes and special destinations can actually be traveled in each case with the current vehicle.

SUMMARY OF THE INVENTION

Against this background, an object of the present invention is to provide a navigation system, and a method for operating the system, that permits the integration of specific special destinations and/or categories of special destinations in route planning, taking into account use limitations of the path network in as efficient a manner as possible.

In concrete terms, one aspect of the invention relates to a navigation system for ascertaining qualified special destinations with a database, in which traffic nodes and path sections connecting them and the properties thereof are stored, having a route computation device, wherein special destinations stored in the database are linked in each case to one or more traffic nodes in the form of connecting nodes, in particular highway exits, and wherein each special destination is assigned with respect to each connecting node that is linked thereto at least one total length of a first total path connecting the special destination and the connecting node, and in particular also the itinerary of the first total path.

The object may be achieved by providing that at least in the case where the first total path has a use limitation, the special destination and the connecting node are also assigned at least the total path length of a second total path, in particular even of further total paths, which have (has) use limitations lower at least with respect to one limitation parameter than the first total path. The second total path and, if appropriate, further total paths, can additionally also be assigned with respect to their itinerary and stored.

The system according to an aspect of the invention is advantageously based on a database in which each special destination is assigned those connecting nodes from which the respective special destination can be reached via available path sections. It is possible here to omit the connecting locations from where the special destination is too remote, i.e., the connecting total path exceeds a specific length in terms of linear distance, or measured in kilometers of road, or the required driving time, or required fuel expenditure.

A preselection of links between special destinations and connecting nodes is thus made. However, it is also ensured that the respectively linked connecting nodes and special destinations are connected by existing path sections and that the path connecting them can be traveled with a definable maximum expenditure.

That means that in the search for special destinations along a pre-calculated route or from a connecting node, initially only those special destinations are considered that can be reached from the connecting nodes easily/quickly in terms of the correspondingly defined distance. For each corresponding special destination, at least one possible total path connecting the special destination to a connecting node is typically present in the database. In the normal case, a plurality of alternative total paths connecting the special destination to a specific connecting node are also present for a special destination.

During route planning, one aspect of the invention provides that, after input of specific special destinations or categories of special destinations, not only the total path that is shortest according to the respectively given metric is made available, but also alternative total paths with lower use limitations, if such alternative total paths exist and at least for the case that the shortest total path includes use limitations. Typically, the corresponding alternative paths/total paths, or at least their respective total path lengths, are listed and displayed to the user/driver using a user interface. If the total path that is shortest in the given metric between the connecting node and the special destination includes no use limitations, it is immediately assigned to the special destination, or, for example, only this total path is displayed via the user interface. However, in this case, additional, longer total paths can also be displayed and assigned. If the shortest total path includes use limitations, the linked pair of special destination and connecting node is assigned further total paths that have lower use limitations in the database. A use limitation of a total path is here understood to mean in each case the strongest restriction with respect to a limitation parameter that exists on a path section of the total path. For example, if a height restriction for the vehicle of 3.5 m on a path section of a total path is given, and a restriction of 3.2 m on another path section of the same total path, the total path is given a height restriction of 3.2 m.

During management of the database, for example after the ascertainment of the first total path having use limitations, the corresponding path section with the strongest limitation/most restrictive limitation with respect to a limitation parameter is selected and eliminated for the purposes of finding a total path having lower use limitations, and a search is carried out for new total paths between the special destination and the connecting node that bypass the eliminated path section. Such further total paths are typically longer in the given distance metric, but have lower use limitations. In this way, by omitting specific path sections that include use limitations, increasingly long total paths with decreasing use limitations are successively ascertained. This method is interrupted either when a specific total number of total paths between a special destination and a connecting node is reached, or when a specific maximum length of the ascertained total path is reached. Other interruption criteria are also conceivable. In this way, each pair consisting of a special destination and a connecting node is assigned one or more total paths in the database. These can be arranged in terms of order, for example, by length of the total path, starting with the shortest total path, or according to specific restrictions, which are, for example, also pre-selectable. For example, if the navigation system is specialized for trucks, it may be sensible to arrange the total paths in each case according to the restriction of the limitation parameter "admissible total weight." Later, during the system run-time, a user can thus select in a simple manner further total paths corresponding to the offered sequence of the total paths until the limitation of the admissible total weight on the offered total path corresponds to his actual vehicle parameters.

The preselection of the limitation parameter for arranging the offered total paths in each case between a special destination and a connecting node in terms of order can be predetermined in the database or also be selected by the user during the system run-time.

The following parameters can be restrictions/limitation parameters that can be taken into account in a list for the computation of total paths and in particular also for arranging the offered total paths in terms of order: vehicle height, vehicle width, actual or permissible total weight of the vehicle, vehicle length, actual or permissible total weight on one axle of the vehicle, vehicle type (for example motor bicycle, bicycle, truck with trailer, truck without trailer, lowboy, container transporter), minimum speed (which must be achievable by the relevant vehicle). In addition, various combinations of two or more of said limitation parameters are conceivable, and additionally also limitations concerning the load or the permissible load, such as for example the additional load weight (actual or permissible), the type of the transported goods (hazardous goods, explosive goods, flammable goods, chemically hazardous goods) or other parameters connected to the transport (transport only in a convoy or similar). These limitations concerning in particular the load or further parameters can additionally be combined with the above-mentioned limitations concerning the vehicle in a more restrictive sense and be taken into account in each case in the categorization/arrangement in terms of order of the total paths with respect to the use limitations.

The driver can then, for example, select that the total paths are arranged in terms of order first according to the limitations of the vehicle height and, with identical permissible vehicle height, according to the weight limitations for the vehicle. However, an order according to the vehicle length and width and any other combinations is also conceivable.

With the database that is managed according to the invention, it is possible, with low hardware complexity, even for a special vehicle, for a selection of total paths to be made available to the driver for preselected special destinations within a very short period of time along which the special destinations can be reached from the given connecting node. By way of example, when selecting a category of special destinations, a selection of special destinations of similar type, for example gas stations, that can be reached from different connecting nodes, can be made available to the driver such that the driver can select from which connecting node the driver wishes to approach a corresponding special destination, depending on the appeal of the total path.

One advantageous embodiment of the invention makes provision for the connecting nodes that are assigned to a special destination to satisfy a first selection criterion. By way of example, the connecting nodes selected for the search for corresponding special destinations can be selected depending on whether corresponding special destinations are available within a given maximum distance from them according to a given metric. The metric can, in this instance, take into account, for example, the distance in kilometers of road, the required travel time, or the fuel expenditure, or a combination of these parameters, individually or in combination. By way of example, it is also possible to take into account the maximum grade of corresponding path sections or the overall difference in elevation that is traveled.

A further advantageous embodiment of the invention provides for the number of the total paths assigned to a special destination and to a connecting node to be limited by an upper limit of the admissible total path length and/or by an upper limit of the number of total paths.

The navigation system according to an aspect of the invention can additionally advantageously be configured such that a use limitation includes admissible limit values with respect to one or more limitation parameters, wherein the limit value with respect to a limitation parameter is given by the respectively most restrictive limit value of the path sections of the respective total path. It is possible in such case to preselect, when starting the navigation system, which limitation parameters are taken into consideration. This can be done, for example, in an initial parameterization of the navigation system for a relevant vehicle. However, if the vehicle has a normal width, for example, but a very tall height, it is possible to preset that only use limitations with respect to the vehicle height are taken into account when selecting the initially provided total paths and when arranging in terms of order the displayed total paths in each case to a special destination and a connecting node.

According to the provision of another advantageous embodiment of the invention, in particular a plurality of connecting nodes that are linked to in each case at least one special destination is provided, wherein at least one special destination and one connecting node that is linked thereto, in particular a plurality of location pairs consisting of in each case one special destination and one connecting node linked thereto, are assigned in each case a plurality of total paths connecting them having different use limitations and total path lengths, and for each location pair, the total paths are arranged according to their total path length.

The decisive metric on which the above-described order of the total paths is based, as already mentioned above, can be, for example, path lengths, measured in kilometers of road, required driving time or fuel expenditure.

An aspect of the invention can additionally advantageously also be embodied by a limitation parameter being the vehicle height and/or the vehicle width and/or the total vehicle weight and/or the admissible total weight of the vehicle and/or the vehicle length and/or the vehicle type and/or the admissible axle load per axle and/or the minimum speed and/or the use prohibition for loaded hazardous goods.

An aspect of the invention additionally relates to a method for operating a navigation system of the type explained above, in particular with respect to a given vehicle, wherein provision is made for one or more connecting nodes to be selected, in particular as stations on a fixed route, for the special destinations to be selected for each connecting node, which special destinations are linked thereto by way of assignment in the database, for the connecting node to be assigned at least one total path for each special destination connected thereto, as long as only one total path between the connecting node and the special destination is stored in the database, and, if the database has a plurality of total paths as connections between the connecting node and the special destination having different use limitations, for that total path to be ascertained and assigned to the connecting node which permits passage of the vehicle while taking account of the existing use limitations and which also has the smallest total path length, taking into consideration the limitation parameter values of the current vehicle.

The values of the current vehicle with respect to the limitation parameters under consideration are largely known and can be input advantageously during initial parameterization of the navigation system; however, they can also be queried in the planning of a concrete route. In addition, further limitation parameters that concern, for example, the load or variable states of the vehicle (for example whether a trailer is hitched) can be indicated during the concrete route planning.

Limitation parameters that are invariable with respect to the actual vehicle in which the navigation system is employed can be populated into the database after an initial parameterization such that the corresponding pre-computed total paths in each case between special destinations and connecting nodes have already been taken into consideration. The corresponding limitation parameters, however, can also be indicated in the concrete route planning together with the in each case currently incoming limitation parameters and then be taken into account in the evaluation of the available total paths for each pair of special destination and connecting node.

With the method according to an aspect of the invention, the navigation system can itself indicate the shortest total path between a connecting node and a special destination that the current vehicle can travel, if the parameter values of the current vehicle are known or corresponding parameter values are input. This can occur for different pre-selected special destinations and connecting nodes, wherein the intermediate results can be populated into a total route planning in a manner that is customary according to the prior art.

According to the provision of one advantageous embodiment of the method according to the invention, for each pair of special destination and connecting node that is linked thereto, total paths, starting with the shortest total path, in the order of increasing total path length, are compared to the parameter values of the given vehicle with respect to the limitation parameters, and, if a total path can be traveled by the given vehicle, this total path is selected and the selection method for this pair consisting of a connecting node and a special destination is interrupted. This method describes in detail the assignment of a shortest possible total path to a special destination that can be traveled by the current vehicle in real time/system run-time.

According to the provision of a further advantageous embodiment of the invention, the admissible vehicle length and/or the vehicle width and/or the vehicle height is taken into account as the limitation parameter. Also conceivable as limitation parameters that are to be taken into consideration are the admissible or actual vehicle weight and/or the actual transport or the transport admission for hazardous goods and/or the vehicle type.

According to an additional provision for the method according to the invention, one or more categories of special destinations are selectable advantageously by the operator for the search for special destinations and be offered by the user interface. Possible special destinations in this connection are, for example, garages, gas stations, rest areas, restaurants, hotels, malls, police stations or the like.

If a special destination is linked to a plurality of connecting nodes, and if the total paths, in particular with corresponding use limitations, are known, it is also possible in the incorporation of selected special destinations in the final route planning to also take into consideration that a special destination will not be exited on the same total path on which it was entered, but that a special destination is approached from a first connecting node and then, to continue along the route, a further connecting node that differs from the first one is approached from the special destination so as to shorten the path with respect to following the total route.

According to a provision of a further advantageous embodiment of the invention, it is possible to display the connecting nodes and the total path lengths between in each case one special destination and the connecting node that is linked thereto for the found special destinations.

To terminate the route planning, as explained above, it can be provided that one or more special destinations are selected from the found special destinations and incorporated in a route computation.

BRIEF DESCRIPTION OF THE DRAWINGS

The invention will be illustrated in different figures below with respect to an exemplary embodiment and explained below. In the figures.

DETAILED DESCRIPTION OF THE PRESENTLY PREFERRED EMBODIMENTS

Figure 1:
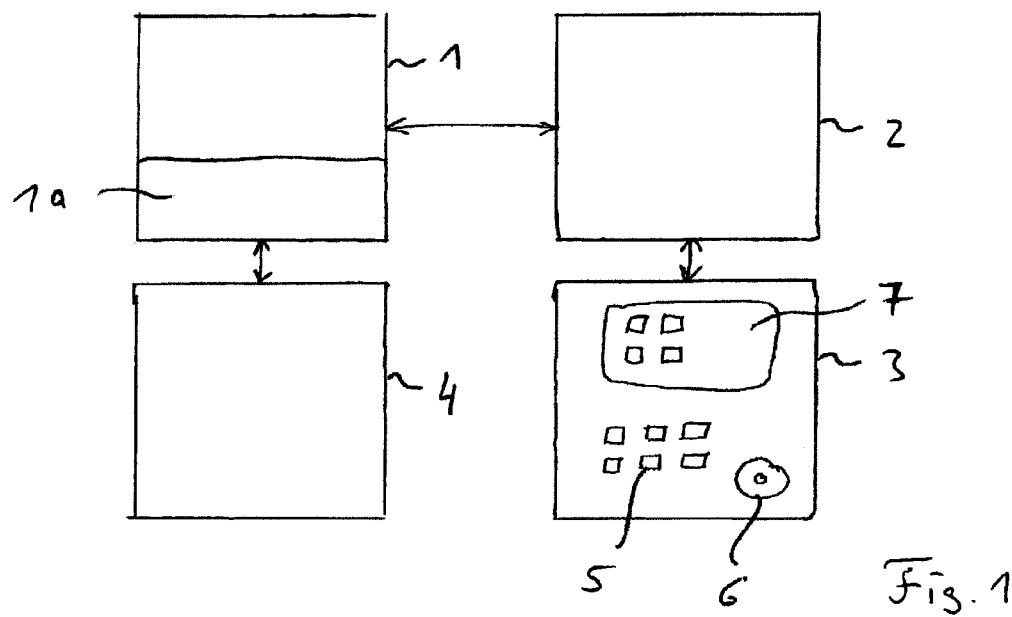
FIG. 1 schematically illustrates the setup of a navigation system.

FIG. 1 schematically illustrates a navigation system with a database 1, a route computation device 2, a user interface 3, and a location device 4. The database 1 includes a memory device in which path nodes/traffic nodes and path sections for a geographic area are stored. In addition to the path sections connecting the path nodes/traffic nodes, the use limitations thereof are stored in the form of limitation parameters and limit values for the corresponding parameters. The database additionally includes special destinations of different categories and the path sections that connect the special destinations to other traffic nodes in the form of connecting nodes, and the properties thereof.

Within the database, connecting nodes, for example in the form of highway exits, are linked to corresponding special destinations, if specific conditions are present, such as, for example, a geographic linear distance between the respective special destination and the connecting node that does not exceed five or ten kilometers.

For the corresponding pairs of connecting nodes and special destinations, in each case one or more total paths that connect them are stored. In special cases, only a single total path is stored if it has no use limitations at all. In many cases, two or more total paths are stored for such a pair, wherein these have different path lengths, measured by the respectively underlying metric, and different use limitations. The metric for the determination of the path length can be based, for example, on the distance between the special destination and the connecting node in the form of kilometers of road or on the driving time or the fuel expenditure required for the connection.

The individual ones of the path sections that connect the respective special destination to the connecting node that is linked thereto are assigned different use limitations, such that the use limitation of a total path is defined by the respectively strongest restriction of a path section to be traveled. Since different stored total paths contain different combinations of path sections, different parameter values of the limitation parameters also result as a total use limitation for the total paths. The stored total paths for, in each case, one special destination and one connecting node are arranged in ascending order according to the distance in the form of kilometers of road to be traveled. In the transition to a respectively longer total path, the omission or the reduction of use limitations comes about successively. Provision may be made, for example, for, in each case, so many total paths to be given that the longest one of these total paths is free of use limitations. At this point at the latest, any further search for total paths is no longer useful.

The location device 4 of the navigation system can be based, for example, on a typical GPS system (global positioning system) and permits the determination of the current position of the vehicle. The current position can be made available, for example, as the first connecting node.

The user interface 3 of the navigation system includes an input device 5 having keys and/or a joystick 6, and a display device 7, for example in the form of a touchscreen. What are known as soft keys, which serve for the input of data, can be shown on the touchscreen 7.

A series of total paths and the use limitations thereof can be displayed, for example, on the display field 7 for the respective special destinations in each case with respect to one connecting node. The user can then select one of the total paths for his vehicle by touching the screen at the total path displayed at the corresponding location.

The database 1 typically has a memory device in which the special destinations and the connecting nodes linked thereto and possibly also the total paths that are stored for them are contained. The memory device within the database 1 is designated 1a.

Figure 2:
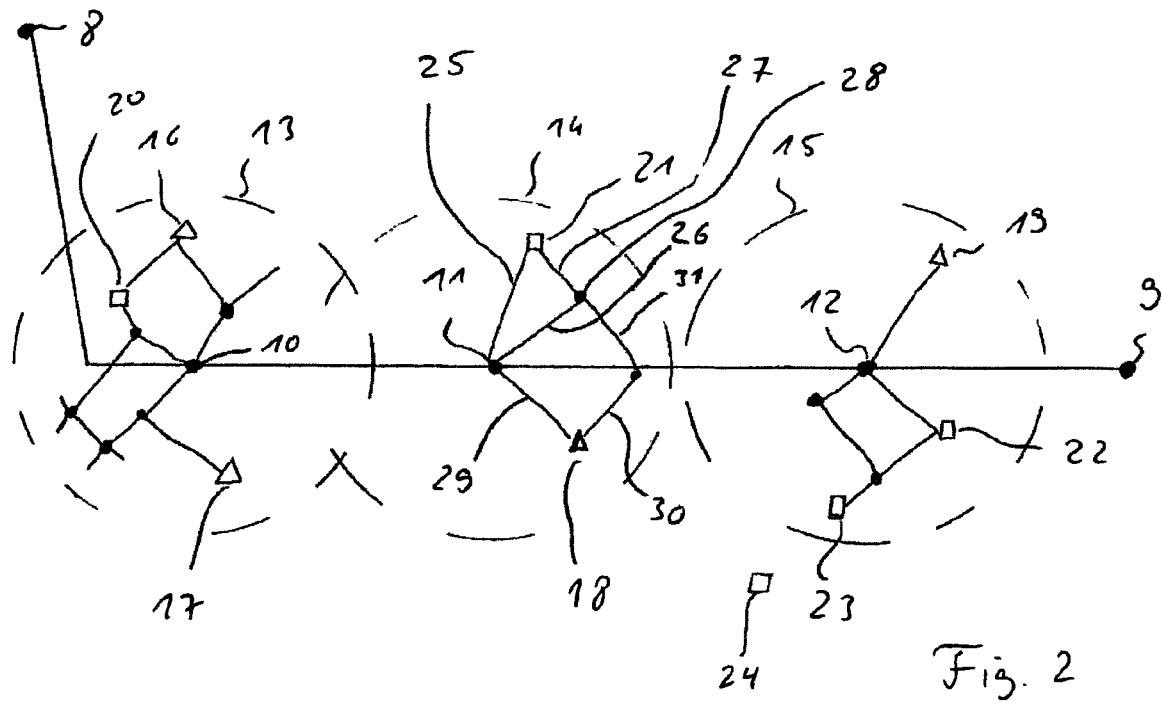
FIG. 2 schematically illustrates a planned route between a starting point and a destination point having three connecting nodes and special destinations located in the vicinity thereof.

FIG. 2 illustrates a route between a starting point 8 and a destination point 9 and three connecting nodes 10, 11, 12, which in this case represent highway exits. Around the respective connecting nodes 10, 11, 12, in each case a circle 13, 14, 15 is drawn in dashed lines, which designates the catchment area of the respective connecting nodes, i.e., the geographic area within which special destinations can be linked to the respective connecting nodes. In each case two types of special destinations are represented, specifically gas stations, symbolized by triangles 16, 17, 18, 19, and restaurants, symbolized by squares 20, 21, 22, 23, 24. What can be seen is that the plotted special destinations in the two categories, restaurants and gas stations, are, in each case, assigned to the connecting nodes 10, 11 or 12, except for the restaurant designated 24, which is located outside the circle 15 and thus at a geographic distance from the connecting node 12 that is too large as to be linked thereto.

The remaining special destinations are linked, in each case, to the connecting nodes 10, 11 or 12. Total paths, which connect the special destinations 16 to 23 to the connecting nodes 10, 11 or 12, are thus stored in the database 1. By way of example, the restaurant 21 is directly connected to the connecting node 11 by way of a path section 25, which at the same time represents a total path connecting the two. This total path 25 can have, for example, the shortest path length between the connecting node 11 and the special destination 21. However, the path section 25 shall have a use limitation in the form of a limitation relating to the admissible total weight of vehicles for the use of this path section. The admissible total weight is limited, for example, to a maximum of 12 tonnes.

For this case, in addition to the path section 25, the connection between the connecting node 11 and the restaurant 21 via the path sections 26 and 27 is stored in the database 1 as a first additional total path, wherein the path sections 26 and 27 are connected at the traffic node 28. The path section 26 shall have, for example, as a use limitation, a height limitation for vehicles with the maximum admissible total height of 2.5 m. The path section 27 has no use restriction. The second total path 26, 27 thus has the use limitation of the path section 26 and thus the limitation to a vehicle height of 2.5 m. An additional total path having the path sections 29, 30, 31 and 27 can be stored, wherein none of the mentioned path sections shall have use limitations. This comparatively longest total path is the one that can be traveled by each vehicle.

If restaurants for the stated route are intended to be found, for example, the user interface 3 can offer connections between the connecting node 11 and the restaurant 21 in the form of three total paths, the longest of which has no use limitations.

The use limitations of the shorter paths 25 and 26, 27 can either be compared by the driver to the data of the present vehicle, or they can be compared automatically within the navigation system 1, 2, 3, 4, if the navigation system knows the parameters of the current vehicle, such that that shortest total path is selected for which the use limitations do not render the path inaccessible to the current vehicle.

Figure 3:
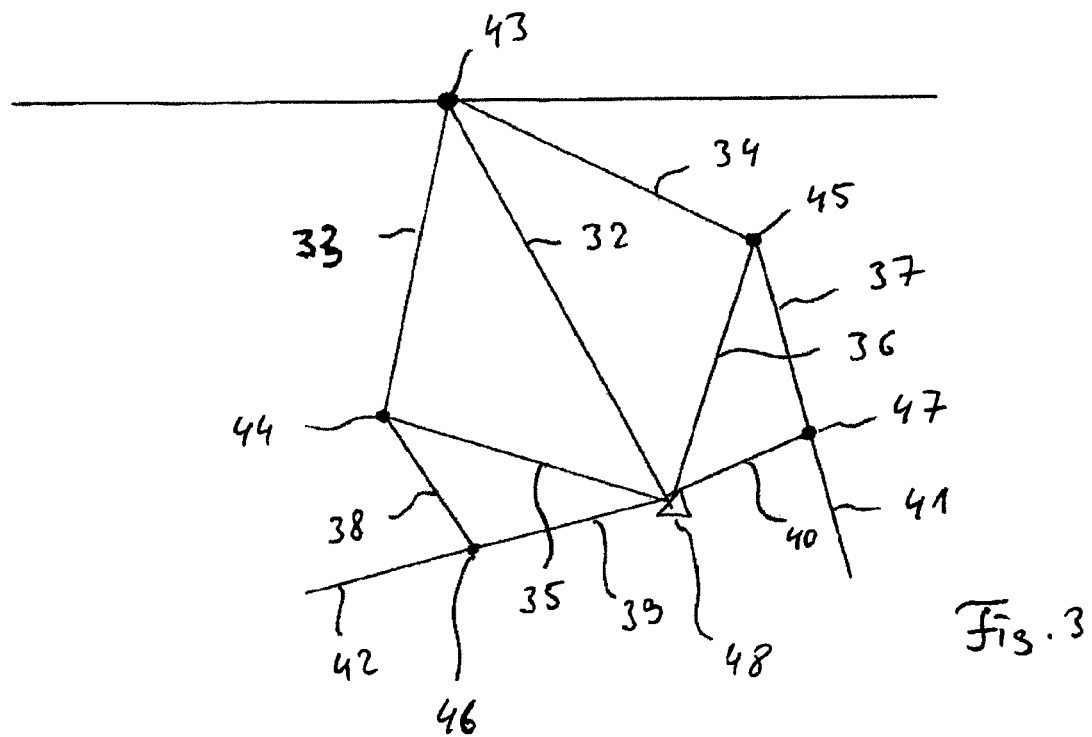
FIG. 3 illustrates a connecting node and a special destination with different total paths connecting them.

The arrangement of the selected total paths shall be explained with respect to the use limitations with reference to FIG. 3, if use limitations are taken into consideration with respect to different limitation parameters. An assumption is made in the stated case that the special destination 48 shall be reached from the connecting node 43. The shortest path section 32 between the connecting node 43 and the special destination 48 has a use limitation with respect to the vehicle height and the vehicle weight. The maximum admissible vehicle height is 2.3 m, and the maximum admissible total weight of the vehicle is 7.5 tonnes. This shortest total path is first in the series of stored total paths between the connecting node 43 and the special destination 48, since it represents the shortest total path. An assumption is made below that the total paths are primarily arranged in terms of order according to the limitations of the vehicle height and then, for the same height limitation, according to the limitations of the vehicle weight. In a concrete example, the following use limitations shall apply:

| | |
|---|---|
| Path section 33: | height limitation 2.3 meters, |
| path section 34: | height limitation 2.8 meters, |
| path section 35: | weight limitation 7.5 tonnes, |
| path section 36: | weight limitation 7.5 tonnes, |
| path section 37: | weight limitation 18 tonnes, |

-continued

| | |
|---|---|
| path section 38: | weight limitation 18 tonnes, |
| path section 39, 40: | no use limitations. |

The stated exemplary use limitations would result in the following order of the stored total paths:

The shortest total path, albeit with strong use limitations, would be path 32 (2.3 m; 7.5 tonnes).

The second total path would be the path having the path sections 33, 35 (2.3 m; 7.5 tonnes; longer total path length).

The next total path in the results list would be the path having the path sections 33, 38, 39 (2.3 m; 18 tonnes).

The next total path would be the path having the path sections 34, 36 (2.8 m; 7.5 tonnes).

The next total path would be the path having the path sections 34, 37, 40 (2.8 m; 18 tonnes).

Such an arrangement of the total paths in the stored selection of total paths could be advantageous in particular if the current vehicle has a critical total height and a less critical, i.e., less high, admissible total weight. However, other weightings/orders in the arrangements of the stored total paths are also conceivable. For example, a list of total paths that is arranged in terms of order according to specific aspects can combine different total paths to different special destinations of the same category, also from different connecting nodes.

Figure 4:
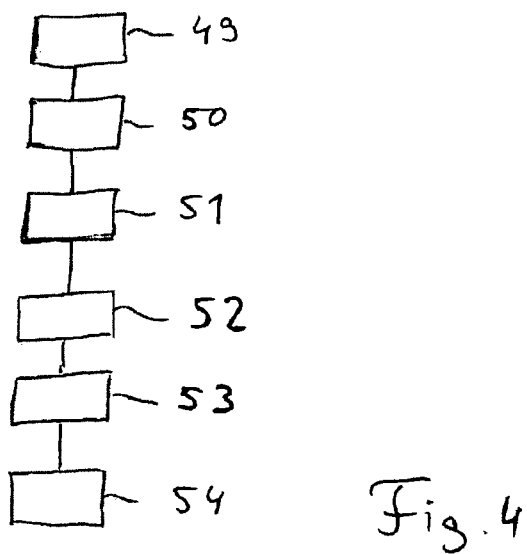
FIG. 4 illustrates a flowchart which illustrates the function of the navigation system according to the invention and of the method for the operation thereof.

FIG. 4 shows a typical method sequence during operation of the navigation system.

In a first method step 49, a starting point and a destination point are input into the navigation system using the user interface 3. In a second step 50, a route between the starting point and the destination point with connecting nodes 10, 11, 12, 43 is computed by the route computation device 2. In a third step 51, which could also occur before the second step 50 of route computation, special destinations or categories of special destinations, which are subject of a search, are input via the user interface 3.

Since the route computation device computes connecting nodes automatically, and in this respect lists of total paths which connect the corresponding special destinations to the connecting nodes are already stored for various categories of special destinations, one or more total paths that branch off the route at connecting nodes and lead to the desired special destinations can be given directly in a fourth step 52. The total paths that are available for selection are displayed using the user interface, for example on a touchscreen.

Together with the total paths, the use limitations for the individual total paths are displayed in the form of the limitation parameters and in particular additionally in the form of the limit values of the individual limitation parameters.

The driver can then select one from the offered total paths, the use limitations of which match his vehicle, and in a fifth step 53, the route computation device 2 computes a more detailed plan for the route, in which the corresponding special destination is included. This can also be done simultaneously for different special destinations that are selected in a first step and for the correspondingly additionally selected total paths.

In a last step 54, the route guidance begins on the basis of the computed route and by the location device 4.

Provision may be made for the second step of selecting special destinations or for the step in which specific total paths to a pre-selected special destination are selected to be carried out belatedly or repeated at any time during traveling along the route, for example when the driver misses the exit from a connecting node and a similar special destination shall be approached at the next connecting node.

The invention permits comfortable and fast route planning even for vehicles that are subject to special use limitations in the case where the navigation system has a sufficient memory capacity and corresponding preparation for the requirements, in particular also in the case of a relatively weak computational power of the navigation system.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A navigation system for ascertaining qualified special destinations, the navigation system comprising:
   a user interface having a display and an input configured to receive inputs from a user of the navigation system, the inputs including (i) one or more special destinations; and (ii) one or more use limitations;
   a GPS locator that communicates with global positioning satellites to determine the current location of a vehicle in which the navigation system is installed;
   a database storing:
      (a) a plurality of traffic nodes,
      (b) path sections connecting said traffic nodes,
      (c) properties of the traffic nodes, and
      (d) special destinations, including any special destinations input via the user interface, the special destinations being linked, in each case, to one or more of the traffic nodes in the form of connecting nodes; and
   a route computation device, the route computation device being configured to, based at least in part on current vehicle location information from the GPS locator:
      assign each special destination, with respect to each connecting node that is linked thereto, at least one total path length of a first total path connecting the special destination and the connecting node,
      at least in a case where the first total path has a limitation corresponding to a use limitation input by the user, assign the special destination and the connecting node at least the total path length of a second total path that has lower use limitations at least with respect to the input limitation parameter,
      display, on the user interface, the first and second total paths including an indication of the total paths and the use limitations for each total path, the first and second total paths being arranged in ascending order of total path length, and
      receive, from the user using the user interface, a user selection of one from among the first and second total paths, wherein, in management of the database, after ascertainment of the first total path having use limitations, the corresponding path section with the most restrictive limitation is selected and eliminated for purposes of finding a total path having lower use limitations, and a search is carried out for new total paths between the special destination and the connecting node that bypass the eliminated path section.

2. The navigation system as claimed in claim 1, wherein the connecting nodes that are assigned to a special destination satisfy a first selection criterion.

3. The navigation system as claimed in claim 1, wherein a number of the total paths assigned to a special destination and to a connecting node is limited by an upper limit of an admissible total path length and/or by an upper limit of the number of total paths.

4. The navigation system as claimed in claim 1, wherein a use limitation includes admissible limit values with respect to one or more limitation parameters, wherein the limit value with respect to a limitation parameter is given by the respectively most restrictive limit value of the path sections of the respective total path.

5. The navigation system as claimed in claim 1, wherein a plurality of connecting nodes that are linked to, in each case, at least one special destination is provided, wherein at least one special destination and one connecting node that is linked to the at least one special destination, forming a plurality of location pairs consisting of, in each case, one special destination and one connecting node linked thereto, are assigned, in each case, a plurality of total paths connecting them having different use limitations and total path lengths, and, for each location pair, the total paths are arranged according to their total path length.

6. The navigation system as claimed in claim 1, wherein the respective total path lengths are measured in kilometers of road, or in the driving time required to travel the respective total path, or in fuel expenditure necessary therefor, according to a standardized computation, or by linking of variables.

7. The navigation system as claimed in claim 1, wherein the limitation parameter is at least one selected from the group of:
  a vehicle height,
  a vehicle width,
  a total vehicle weight,
  an admissible total weight of the vehicle,
  a vehicle length,
  a vehicle type,
  an admissible axle load per axle,
  a minimum speed, and
  a use prohibition for loaded hazardous goods.

8. The navigation system as claimed in claim 1, wherein the connecting nodes are highway exits.

9. A method for operating a navigation system having: a user interface having a display and an input configured to receive inputs from a user of the navigation system, a GPS locator that communicates with global positioning satellites to determine the current location of a vehicle in which the navigation system is installed, and a database storing: (i) a plurality of traffic nodes, (ii) properties of the traffic nodes, and (iii) special destinations linked, in each case, to one or more of the traffic nodes in the form of connecting nodes, the method comprising:
  receiving, from the user interface, inputs of the user, the inputs being stored in the database and including (i) one or more user input special destinations; and (ii) one or more use limitations with respect to a given vehicle;
  selecting one or more connecting nodes as stations on a fixed route;
  selecting special destinations for each connecting node, which special destinations are linked to respective connecting nodes by assignment in the database;
  assigning, based at least in part on current vehicle location information from the GPS locator, the connecting node at least one total path for each special destination, including any special destinations input via the user interface, connected to the connecting node, as long as only one total path between the connecting node and the special destination is stored in the database;
  if the database stores a plurality of total paths as connections between the connecting node and the special destination has different use limitations, ascertaining and assigning to the connecting node the total path that permits passage of the vehicle while taking account of the existing use limitations and that also has the smallest total path length, taking into consideration limitation parameter values of the current vehicle input by the user;
  displaying, on the user interface, total paths, starting with a shortest total path, in the order of increasing total path length including an indication of the use limitations for each total path, and
  receiving, from the user using the user interface, a user selection of one from among the total paths,
  wherein, in management of the database, after ascertainment of the first total path having use limitations, the corresponding path section with the most restrictive limitation is selected and eliminated for purposes of finding a total path having lower use limitations, and a search is carried out for new total paths between the special destination and the connecting node that bypass the eliminated path section.

10. The method as claimed in claim 9, wherein, for each pair of special destination and connecting node linked thereto, the total paths, starting with a shortest total path, in the order of increasing total path length, are compared to parameter values of the given vehicle with respect to the limitation parameters, and, if a total path can be traveled by the given vehicle, the total path is selected and the selection method for the pair consisting of a connecting node and a special destination is interrupted.

11. The method as claimed in claim 10, wherein an admissible vehicle length and/or a vehicle width and/or a vehicle height is taken into account as the limitation parameter.

12. The method as claimed in claim 11, wherein an admissible or actual vehicle weight and/or a current load and/or a transport admission for hazardous goods and/or a vehicle type is taken into account as the limitation parameter.

13. The method as claimed in claim 12, wherein one or more categories of special destinations are selectable for a search for special destinations.

14. The method as claimed in claim 13, wherein the connecting nodes and the total path lengths between, in each case, one special destination and the connecting node that is linked thereto are displayed for found special destinations.

15. The method as claimed in claim 14, wherein one or more special destinations are selected from the found special destinations and incorporated in a route computation.

* * * * *